Dec. 24, 1935. E. MAR Re. 19,796

WASH RAG OR PAD

Original Filed Jan. 30, 1933 2 Sheets-Sheet 1

Inventor
Edmundo Mar

By A. D. Adams
Attorney

Dec. 24, 1935. E. MAR Re. 19,796

WASH RAG OR PAD

Original Filed Jan. 30, 1933 2 Sheets-Sheet 2

Inventor
Edmundo Mar

By A. D. Adams
Attorney

Reissued Dec. 24, 1935 Re. 19,796

UNITED STATES PATENT OFFICE 19,796

WASH RAG OR PAD

Edmundo Mar, Houston, Tex., assignor of one-half to Priscilliano Elizondo, Monterey, Mexico Original No. 1,968,696, dated July 31, 1934, Serial No. 654,282, January 30, 1933. Application for reissue May 22, 1935, Serial No. 22,920

13 Claims. (Cl. 15—209)

This invention relates to wash rags or pads adapted to be used for bath and other cleansing purposes and, among other objects, aims to provide an improved, simple and inexpensive rag composed of natural hard vegetable fibre which may be used alone or which is adapted to be impregnated with an individual portion of soap so as to provide abundant lather instantly. One of the main ideas is to provide a cheap and sanitary rag of this character, which may be used only once and thrown away. Also, the invention aims to provide a hard fibre rag or pad which can be used very effectively and economically to remove grease, paint, ink or dirt from machinery, vessels, etc., with proper solvents, such as gasoline, kerosene, linseed oil and the like.

Other aims and advantages of the invention will appear in the following description, when considered in connection with the accompanying drawings, wherein.

Ordinary wash rags, sponges and the like, which are used in bathrooms, bathhouses, hotels, kitchens, etc., require frequent sterilization to avoid contamination and to prevent the spread of diseases. In using such rags, it is quite a laborious operation to saturate them with sufficient soap to produce a good lather. In fact, they have to be rubbed on the soap quite often while they are being used. Ordinary soap usually slips from the hands, causing bother to find it in soapy water. It is one aim of this invention to provide a greatly improved sanitary, fibrous wash rag which has previously been impregnated with an individual portion of soap so that a new rag can be used on each occasion. The idea is to impregnate the rag or pad with just enough soap for one use so as to avoid unnecessary waste of soap. Also, the invention contemplates the previous impregnation of the rag or pad with individual portions of other substances. Furthermore, the idea is to provide a natural, hard vegetable fibre rag or pad which can be used repeatedly and very effectively to wash machinery and the like with solvents, the principal advantage being the saving of solvent due to the fact that the fibre does not absorb as much of the solvent as the soft fibres of ordinary rags now in general use. Since the fibres are hard, grease and dirt cannot penetrate the strands; hence they may be washed off very easily. Moreover, the fibres will not scratch ordinary surfaces such as enamel, glass, etc. Further, they are pliable and will not injure the hands.

Figure 3:
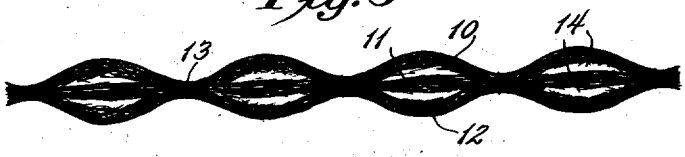
Fig. 3 is an edge view of the rag shown in Fig. 1 and showing three layers of fibre stitched together.

Referring particularly to the drawings, Figs. 1 to 4 disclose a rag or pad of rectangular shape composed of natural layers of Mexican palm fibres which are sufficiently rough to produce the necessary scrubbing or rubbing friction. These palm fibres are strong and light so that the rags or pads made of them will float. However, it is contemplated that fibres of manila hemp, lechuguilla and similar materials may be employed. In Fig. 3, the rag is composed of three layers 10, 11 and 12 of the fibres which are first thoroughly sterilized. The two outer layers 10 and 12 are stitched by separated parallel rows of stitching 13 to the central layer and are shown as being buckled or crimped to provide tubular pockets 14. If desired, these pockets may be filled with coarse fibres or some more or less elastic and yieldable material to keep the pockets open and thereby increase the suction and expulsion effect when the rag or pad is squeezed and released. Before the layers are stitched together, the fibre in the middle layer or in both of the outer layers, or in all of the layers, is previously soaked in a soap solution, either alone, or in combination with one or more chemical compounds which will produce abundant lather in soft or hard water. Ordinary thread is used to bind the layers together and the stitches serve to prevent displacement of the fibre. In making the rag composed of three layers, the two outside layers 10 and 12 are longer than the middle layer and are buckled or crimped to provide pockets of the desired size. The purpose of the pockets is to provide large air spaces between the layers and thereby form an air cushion which causes the rapid formation of soap lather or suds by suction and expulsion when the rag is compressed and released.

Figure 1:
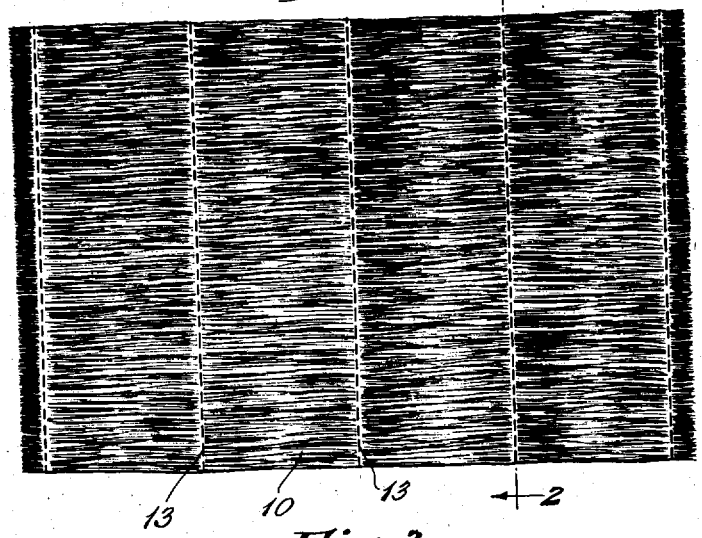
Fig. 1 is a face view of a fibre rag embodying the invention.
Figure 2:
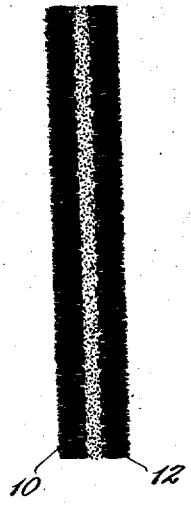
Fig. 2 is a sectional view on the line 2—2 of Fig. 1.
Figure 4:
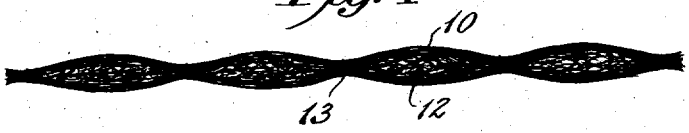
Fig. 4 is an end view of a modified form of the rag composed of two layers of fibre.
Figure 5:
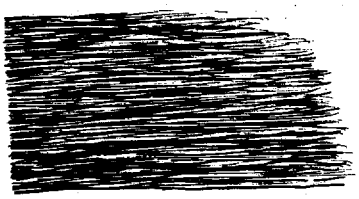
Fig. 5 is a fragmentary view on an enlarged scale, showing the outside face of a palm fibre layer or sheet.
Figure 6:
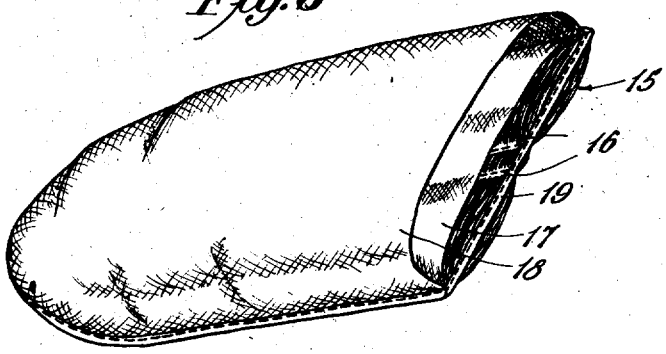
Fig. 6 is a perspective view of a rag or pad in the form of a mitten.
Figure 7:
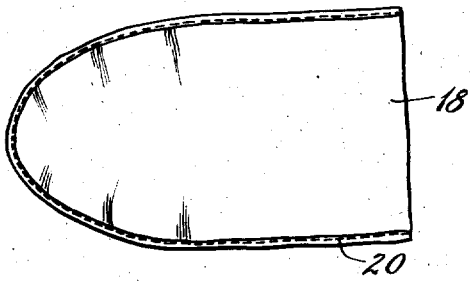
Fig. 7 is a top plan view of the mitten.
Figure 8:
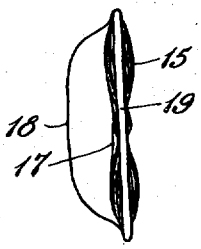
Fig. 8 is an end view of the mitten.
Figure 9:
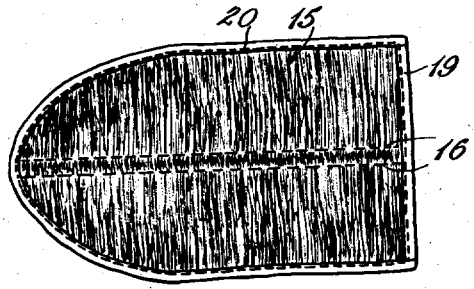
Fig. 9 is a bottom plan view.

Fig. 4 shows two flat layers or sheets of natural fibre stitched together by parallel rows of stitches as illustrated in Fig. 1. These layers are in matted form and are secured together with the strands in each layer generally parallel with the strands in the other layer. The fibres or strands between the rows of stitches 13 bulge outwardly on opposite sides of the pad and these bulging portions provide air spaces or interstices to produce the very desirable suction and expulsion effect which will cause soap to make abundant lather. When this rag is to be used with soap, either or both layers may be impregnated. When it is used for washing machinery, etc. with solvents such as gasoline, kerosene, linseed oil and the like, the interstices or air spaces serve to increase the carrying capacity. The solvent fills the air spaces and clings to the surfaces of the strands, thus tending to prevent dirt from entering the rag. The strands are so close together that the outer faces of the rag act as strainers also to prevent large particles of dirt from entering the rag. Further, the outer strands collect practically all of the dirt and can be cleaned very easily; whereas, ordinary soft fibres quickly absorb dirt and grease in their capillary tubes and must be discarded.

Referring to Figs. 6 to 9, inclusive, there is shown a rag or pad in the form of a mitten. In this case, a rag 15 is shown as being made of multiple layers of fibre stitched together intermediate their edges by parallel rows of stitches 16 to provide tubular air pockets like those shown in Fig. 3 and to one side of the rag is stitched two pieces of waterproof fabric or material 17 and 18 of different widths so as to provide a mitten of such size to fit the hand. The free end of the rag is preferably bound by a tape 19 stitched to the fibre layers. While the inner waterproof piece 17 may be omitted in some cases, it is preferred so as to prevent direct contact of the hand with the rag during its use. It will be observed that both pieces of fabric are wider than the rag and that they are stitched to the edges of the rag by a single row of stitching 20 which serves also to bind the ends of the multiple layers of fibre. The space between the waterproof layers and the rag may be partially filled with a charge of any kind of soap such as the pieces which usually go to waste or powdered soap. This type of pad is not only adapted for use in bathing or washing the body, but is especially useful in cleansing lavatories, bath-tubs, sinks, kitchenware, floors, furniture and other articles. It will last much longer than the ordinary fibre rag without the mitten attachment.

When the improved rag or pad is to be used in hard or salty water, it is contemplated that one of the outer layers of fibre shall be impregnated with citric acid or its equivalent and the other outer layer with bicarbonate of soda or its equivalent; while the middle layer is covered or coated with a thin layer of soap. These materials are selected because they do not decompose the soap.

The chemical reaction of citric acid and bicarbonate of soda in the water produces an effervescence which causes the soap to make abundant foam or suds in any kind of water. The same result may be accomplished by impregnating the outer layers of fibre with soap and depositing bicarbonate of soda in some of the pockets and citric acid in other pockets. This is especially desirable when only two layers of fibre are used, as shown in Fig. 3. In some cases, bicarbonate of soda, alone, will be sufficient if the water is of such nature as to cause the desired effervescence.

From the foregoing description, it will be seen that the improved rags or pads may be manufactured at a very low cost and that they are especially adapted for many uses. They may be wrapped in waterproof paper of "cellophane" and are absolutely sanitary. Their use makes possible a very considerable saving of soap or cleaning solvent and avoids the expense of laundering ordinary rags.

Obviously, the present invention is not restricted to the particular embodiments thereof herein shown and described.

What is claimed is:

1. A rag of the character described composed of layers of palm fibre stitched together with parallel rows of stitching across the strands to hold the layers together the strands in said layers being generally parallel with each other.

2. A wash rag or pad comprising multiple layers of sterilized vegetable fibre sewn together by a plurality of parallel rows of stitches, two of said layers being buckled with respect to each other to provide air pockets in the spaces between the rows of stitches.

3. A wash rag or pad composed of multiple layers of vegetable fibre secured together at least one of the layers being impregnated with soap; and separate charges of citric acid and bicarbonate of soda carried by the layers to produce abundant foam in any kind of water.

4. A wash rag or pad composed of at least two layers of vegetable fibre secured together face to face by spaced rows of stitches and being charged with foam-producing chemicals which react with each other in water and cause soap to form abundant lather in any kind of water.

5. A wash rag or pad composed of three layers of vegetable fibre stitched together by parallel rows of stitching; the outer layers being wider than the middle layer and being buckled to present tubular portions between the several rows of stitches, at least one of the layers being impregnated with soap.

6. A wash rag or pad comprising a flat central layer and opposed buckled layers of hard vegetable fibre stitched to said flat central layer by parallel rows of stitches to provide air pockets between the rows of stitches which produce suction and expulsion in use.

7. A mitten-type pad comprising a rag portion composed of multiple layers of vegetable fibre impregnated with soap and stitched together at intervals; said layers having opposed buckled portions between the rows of stitches to form pockets; and a piece of waterproof material stitched to the opposite sides and one end of the rag portion providing a pocket to receive the hand.

8. A mitten-type pad comprising a rag portion composed of mutiple layers of vegetable fibre stitched together at intervals with the outside layers bowed so as to present pockets between the stitching; and superposed separate pieces of waterproof material stitched to the opposite sides and one end of the rag portion providing a space between said pieces to receive the hand and also a pocket between the fibre layers and the waterproof layers to insert soap or other materials.

9. A mitten-type pad comprising a flat rag portion composed of separate layers of natural hard vegetable fibre extending across the pad and stitched together by parallel rows of stitches across the strands and longitudinally of the pad; and a hand pocket secured to one side of the rag portion.

10. A wash rag or pad for washing machinery and the like with solvents, comprising at least one layer of hard vegetable fibres having strands extending in the same general direction; and securing means across the strands to hold them assembled in substantially flat pad form with the strands on its opposite faces exposed.

11. An elongated rag or pad of the character described composed of layers of natural, hard, vegetable fibres in the form of hair-like strands extending longitudinally of the pad and stitched together across the strands to hold the assembled layers substantially flat in pad form.

12. A wash rag or pad of the character described comprising two layers of natural hard vegetable fibres having strands extending in the same general direction and sewn together across the strands at spaced intervals to provide air spaces between the layers whereby the rag, when compressed and released, will produce a suction and expulsion effect, said fibres being sufficiently rough to produce the necessary cleansing friction.

13. A rag or pad of the character described composed of a plurality of layers of natural palm fibres with the strands extending in the same general direction and secured together by spaced parallel rows of stitches across the strands whereby the pad presents outwardly bulging portions between the rows of stitches to produce a suction and expulsion when the rag is used.

EDMUNDO MAR.